United States Patent
Chen

(10) Patent No.: US 10,308,268 B2
(45) Date of Patent: Jun. 4, 2019

(54) STRAP DISPENSER

(71) Applicant: Hsiu-Man Yu Chen, Taichung (TW)

(72) Inventor: Hsiu-Man Yu Chen, Taichung (TW)

(*) Notice: Subject to any disclaimer, the term of this patent is extended or adjusted under 35 U.S.C. 154(b) by 305 days.

(21) Appl. No.: 15/464,890

(22) Filed: Mar. 21, 2017

(65) Prior Publication Data

US 2018/0273070 A1 Sep. 27, 2018

(51) Int. Cl.
*B62B 1/22* (2006.01)
*B65H 16/00* (2006.01)
*B65H 16/02* (2006.01)

(52) U.S. Cl.
CPC ............ *B62B 1/22* (2013.01); *B65H 16/005* (2013.01); *B65H 16/028* (2013.01); *B62B 2202/025* (2013.01); *B62B 2203/70* (2013.01); *B62B 2206/04* (2013.01); *B62B 2301/10* (2013.01)

(58) Field of Classification Search
CPC ............... B65H 16/005; B65H 16/028; B65H 2405/422; B65H 2301/41386; B62B 1/22; B62B 2301/10; B62B 2206/04; B62B 2202/025; B62B 2203/70
See application file for complete search history.

(56) References Cited

U.S. PATENT DOCUMENTS

| | | | | |
|---|---|---|---|---|
| 1,374,379 A * | 4/1921 | Klein | ...... | B62B 1/264 242/557 |
| 2,285,358 A * | 6/1942 | Rode | ...... | B65H 49/24 242/564.5 |
| 2,654,550 A * | 10/1953 | Winkler | ...... | B21C 47/18 242/559 |
| 2,660,381 A * | 11/1953 | Friedl | ...... | B62B 3/104 211/1 |
| 5,931,484 A * | 8/1999 | Jones | ...... | B21C 47/24 280/47.24 |
| 7,874,510 B2 * | 1/2011 | Martin | ...... | B65B 13/18 242/403 |
| 8,590,124 B2 * | 11/2013 | Baumer | ...... | B21C 47/24 242/547 |

* cited by examiner

*Primary Examiner* — William A. Rivera
(74) *Attorney, Agent, or Firm* — Ming Chow; Sinorica, LLC

(57) ABSTRACT

A strap dispenser includes a main body and two loading units. The loading units are configured to receive a strapping roll. The loading units are connected with a connecting member and an elastic member. When in use, a strapping roll is first placed on one of the loading units to be guided and located between the loading units through the connecting member and the elastic member. When the strapping roll is pulled, the strap dispenser can prevent the strapping roll from being jammed or pulled out of the loading units due to the action of the centrifugal force.

10 Claims, 8 Drawing Sheets

STRAP DISPENSER

FIELD OF THE INVENTION

The present invention relates to an auxiliary tool for a strapping roll, and more particularly to a strap dispenser.

BACKGROUND OF THE INVENTION

A strap dispenser is used as an auxiliary tool for a strapping roll, so that the strapping roll can be used more easily and efficiently. A conventional strap dispenser has a frame. The frame is provided with a shaft. The shaft is inserted through a strap disk. The strap disk has an inner disk and an outer disk. The strapping roll is mounted to the strap disk and located between the inner disk and the outer disk. The frame is provided with two wheels. When in use, the strap is continuously pulled out from the strap disk. The strap dispenser can be moved through the wheels.

Although the above-mentioned strap dispenser has the advantages of simple structure, convenient operation and good mobility, the strapping roll may be jammed or pulled out of the strap disk due to the action of the centrifugal force caused by pulling the strapping roll if the strapping roll is an iron strap roll or a heavier strap roll. The strap dispenser may be unstable and overturned. For installing the strapping roll on the strap dispenser, the strapping roll is first mounted to the strap disk, and then the strap disk is mounted on the shaft. The installation of the strapping roll is time-consuming and labor-consuming. Accordingly, the inventor of the present invention has devoted himself based on his many years of practical experiences to solve these problems.

SUMMARY OF THE INVENTION

The primary object of the present invention is to provide a strap dispenser which is able to guide a strapping roll to be positioned in a labor-saving manner. The center of gravity of the strap dispenser is more stable. The strap dispenser can be operated easily.

In order to achieve the aforesaid object, the strap dispenser of the present invention comprises a main body, two loading units, and a mobile unit. The loading units are mounted to the main body. The loading units each include a first plate and a second plate. A main shaft is provided between the first plate and the second plate. The main shaft is pivotally connected to the main body. The loading devices are further provided with a connecting member. The connecting member is connected to the first plates of the two loading units. The connecting member is connected with an elastic member. The mobile unit is mounted to the main body. The mobile unit includes two wheels.

When the strap dispenser of the present invention is used, a strapping roll is first placed on one of the loading units to be guided and located between the loading units through the connecting member and the restoring force of the elastic member to achieve the labor-saving purpose. When the strapping roll is pulled by the user, the strap dispenser of the present invention can prevent the strapping roll from being jammed or pulled out of the loading units due to the action of the centrifugal force or prevent the strap dispenser from being overturned.

DETAILED DESCRIPTION OF THE PREFERRED EMBODIMENTS

Embodiments of the present invention will now be described, by way of example only, with reference to the accompanying drawings.

Figure 1:
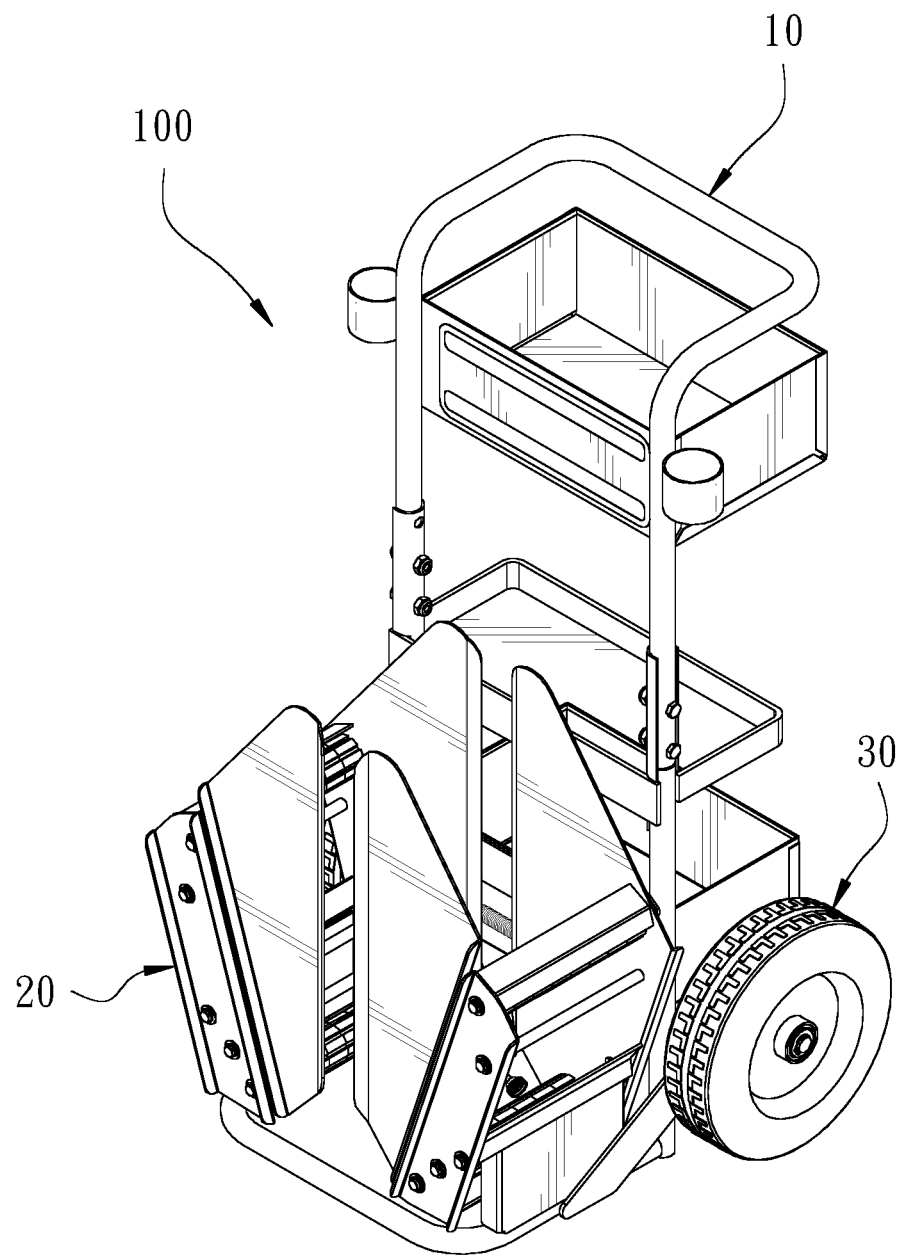
FIG. 1 is a perspective view of the present invention.
Figure 2:
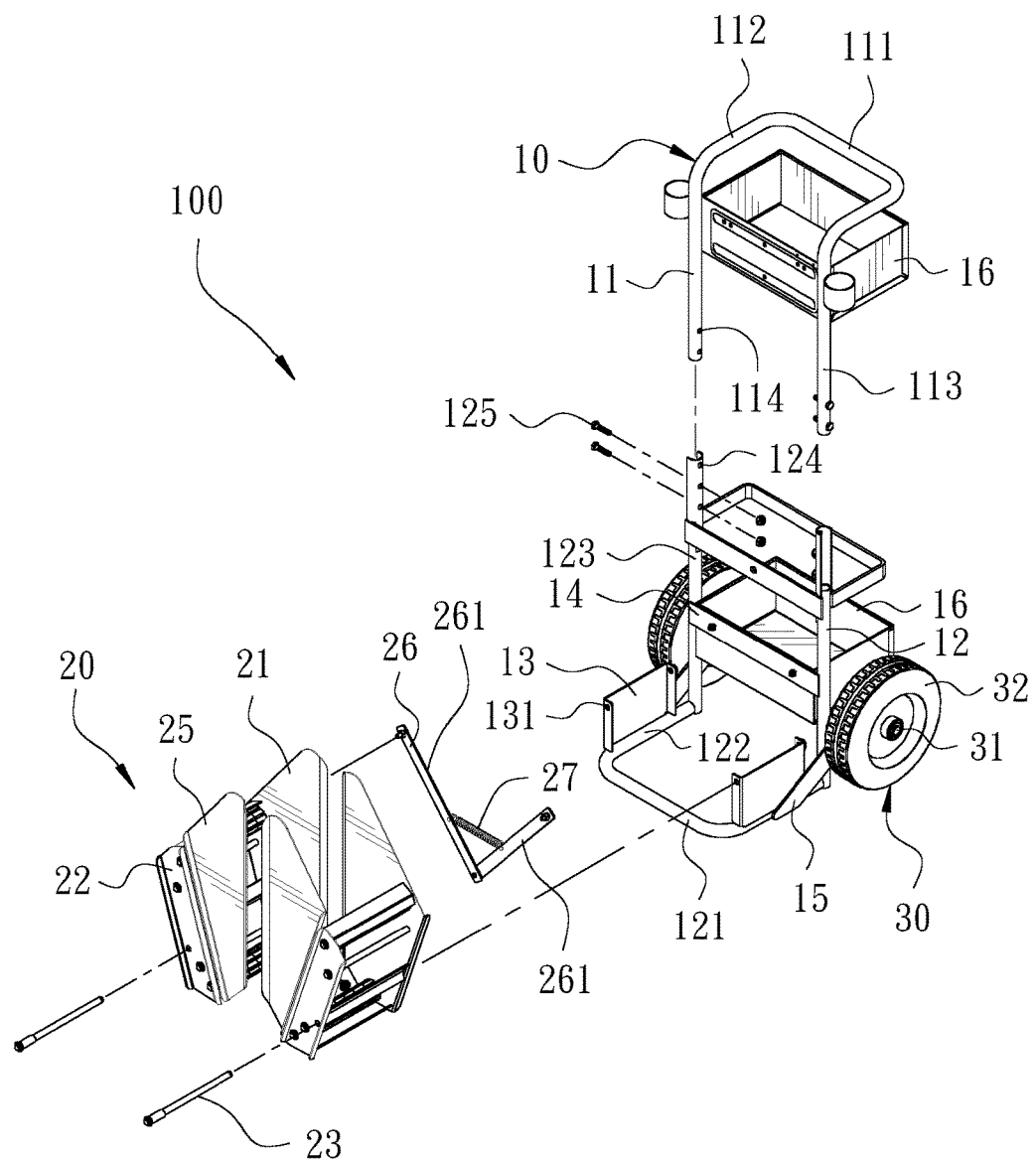
FIG. 2 is a partial exploded view of the present invention.

FIG. 1 is a perspective view of the present invention. FIG. 2 is a partial exploded view of the present invention. The present invention discloses a strap dispenser 100. The strap dispenser 100 comprises a main body 10, two loading units 20, and a mobile unit 30.

The main body 10 comprises a first frame 11 and a second frame 12. The first frame 11 has a first transverse rod 111. Two ends of the first transverse rod 111 are connected with first connecting rods 112, respectively. The first connecting rods 112 are vertically connected with first coupling rods 113, respectively. The first coupling rods 113 are provided with a plurality of first positioning holes 114, respectively. A storage box 16 is provided between the first coupling rods 113 for storing tools. The second frame 12 has a second transverse rod 121. Two ends of the second transverse rod 121 are connected with second connecting rods 122, respectively. Each of the second connecting rods 122 is longitudinally provided with a retaining plate 13. The retaining plate 13 is formed with two perforations 131. The second connecting rods 122 are vertically connected with second coupling rods 123, respectively. The second coupling rods 123 are coupled to the first coupling rods 113, respectively. The second coupling rods 123 are provided with a plurality of second positioning holes 124 corresponding to the first positioning holes 114, respectively. The first positioning holes 114 and the second positioning holes 124 are secured by a plurality of positioning bolts 125. The positioning bolts 125 are adapted to adjust the height of the first frame 11 and the second frame 12. A transverse plate 14 is provided between the second coupling rods 123. One side of the transverse plate 14 is provided with a storage box 16 for storing tools. The second frame 12 is further provided with two support plates 15. The two support plates 15 are disposed at one side of the corresponding second coupling rods 123, respectively.

Figure 3:
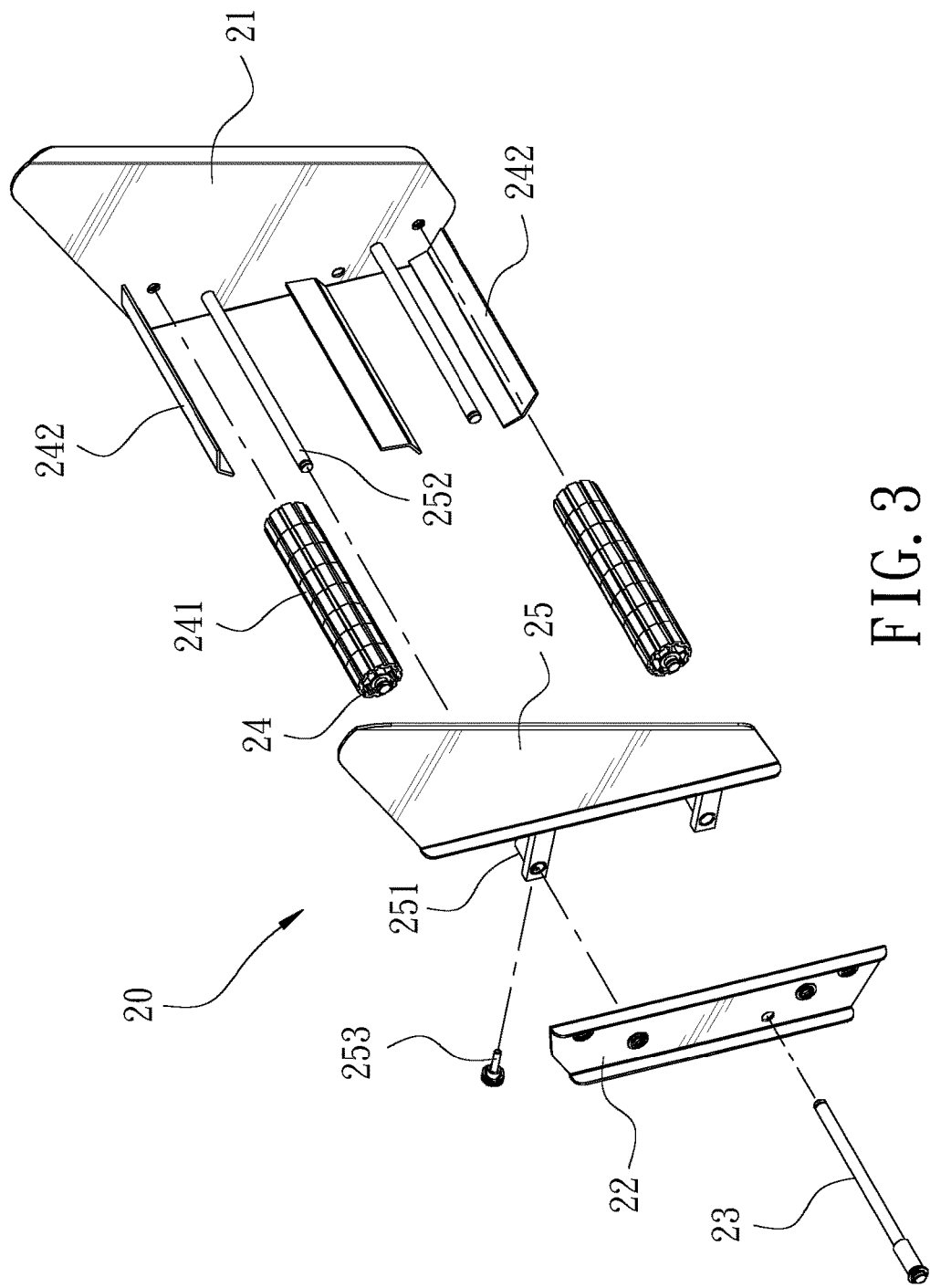
FIG. 3 is an exploded view of a loading unit of the present invention.

The two loading units 20 are mounted to the main body 10. Referring to FIG. 3, each loading unit 20 includes a first plate 21 and a second plate 22. A main shaft 23, two rotating shafts 24, a baffle plate 242, an adjustment plate 25, and two adjustment levers 252 are provided between the first plate 21 and the second plate 22. The main shaft 23 is inserted through the perforations 131 of the corresponding retaining plate 13. The main shaft 23 is located between the rotating shafts 24. A roller 241 is fitted on each of the rotating shafts 24. The baffle plate 242 is disposed at one side of the roller 241 for protecting the roller 241, so that the strap won't be jammed in the roller 241 when the strapping roll 200 is pulled. The adjustment plate 25 is provided with two receiving portions 251. The receiving portions 251 are hollow sleeves. The receiving portions 251 are configured to receive the adjustment levers 252, respectively. The adjustment levers 252 are located between the first plate 21 and the second plate 22. Each of the receiving portions 251 is provided with an adjustment bolt 253 so that the adjustment plate 25 is movable between the first plate 21 and the second plate 22 to adjust the distance between the adjustment plate 25 and the first plate 21. After adjustment, the adjustment bolt 253 is screwed to secure the adjustment plate 25 to the adjustment levers 252. A connecting member 26 is provided between the loading devices 20. The connecting member 26 includes two links 261. The two links 261 are connected to the first plates 21 of the two loading units 20. The two links 261 are pivotally connected to each other. An elastic member 27 is connected between the two links 261. The elastic member 27 is a tension spring. The elastic member 27 provides a restoring force between the links 261.

The mobile unit 30 is disposed at one side of the second frame 12. The mobile unit 30 includes a wheel axle 31. The wheel axle 31 is located on the same plane as the main shaft 23. The wheel axle 31 is inserted through the support plates 15. Two ends of the wheel axle 31 are provided with wheels 32, respectively. The wheels 32 are tires. In an embodiment, the wheels 32 are hard wheels or solid wheels to prevent the wheels 32 from being deflated because the strap dispenser 100 is not used for a long time or because of the excessive weight of the iron strap.

Figure 4:
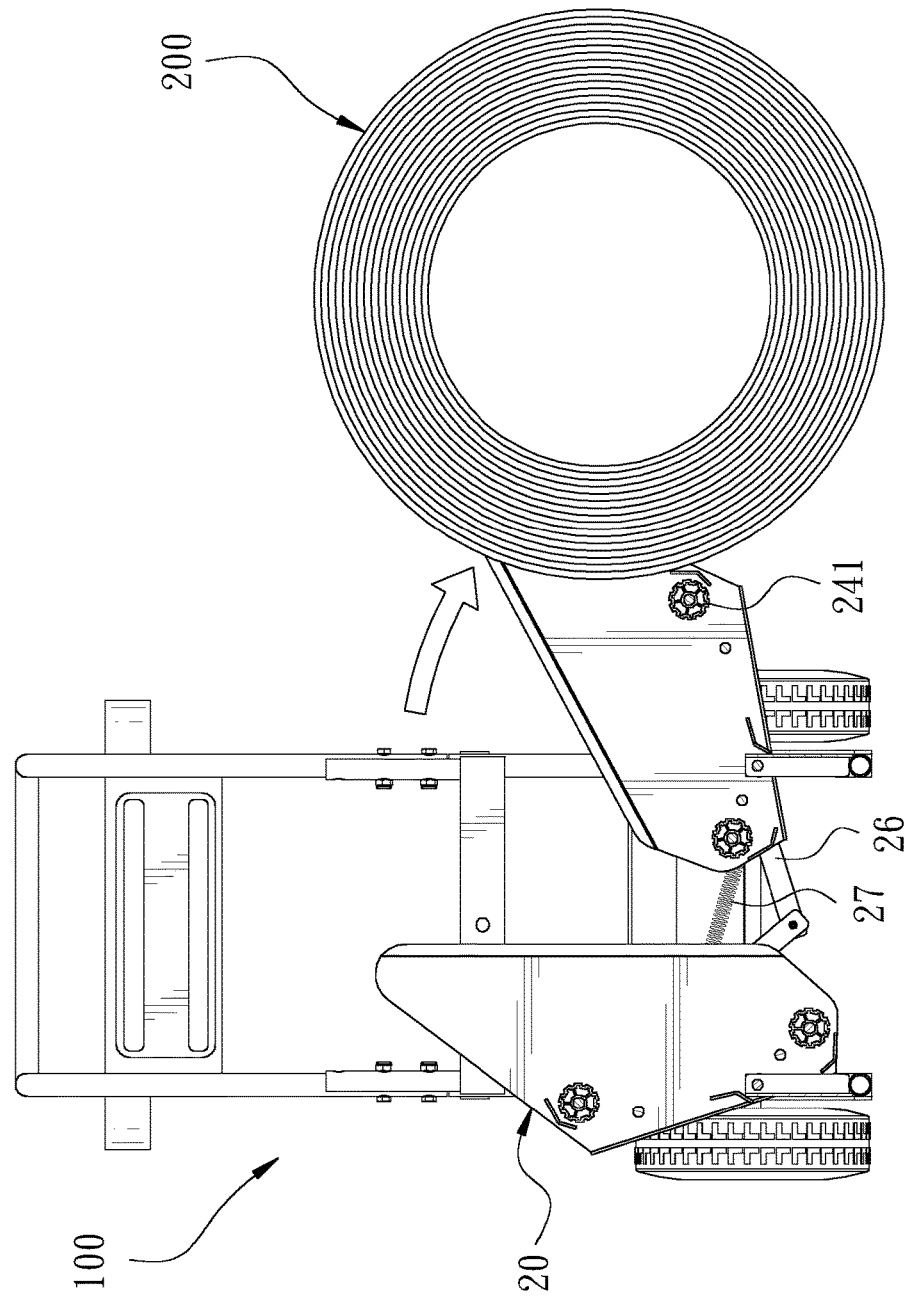
FIG. 4 is a schematic view in accordance with a preferred embodiment of the present invention when in use, showing the loading unit in an open state.
Figure 5:
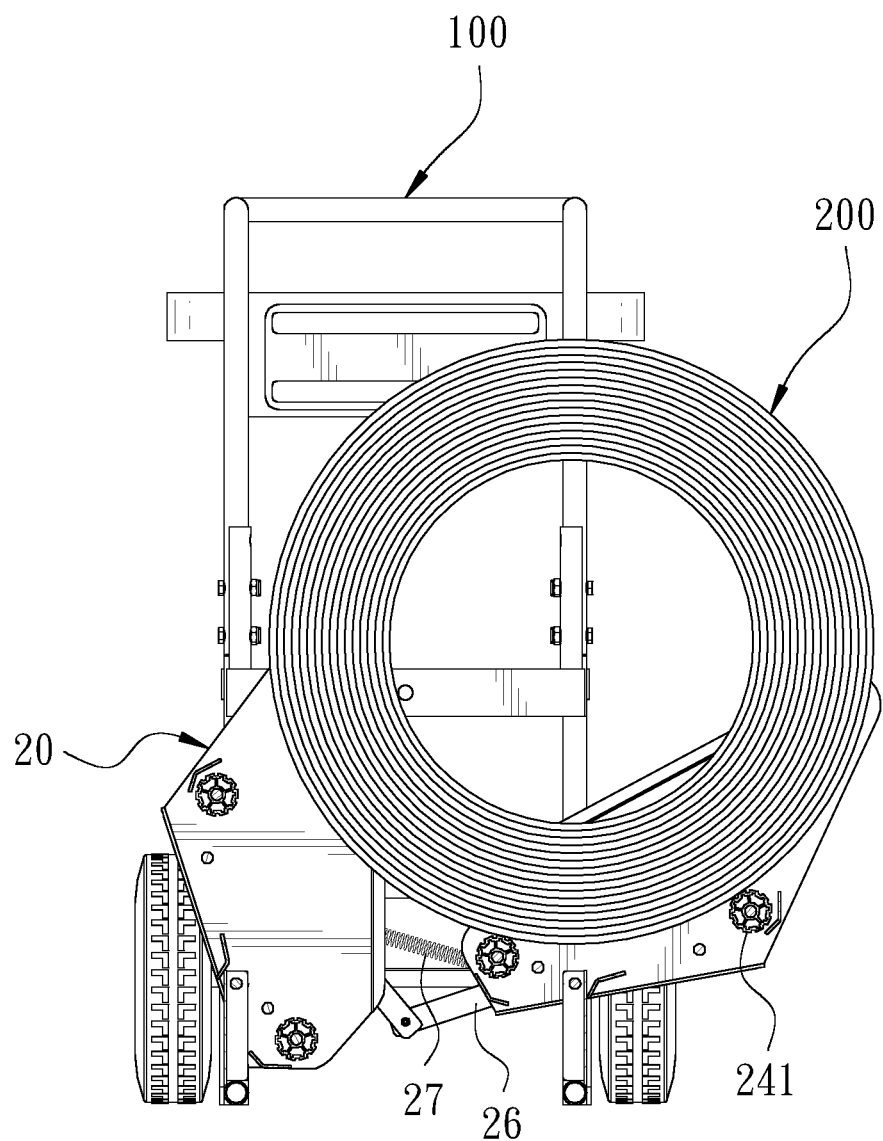
FIG. 5 is a schematic view in accordance with the preferred embodiment of the present invention when in use, showing a strapping roll in an installed state.

As shown in FIG. 4, when the user wants to place a strapping roll 200 on the strap dispenser 100, one of the loading units 20 is pulled outwardly, and the loading unit 20 will get the restoring force of the elastic member 27 through the connecting member 26 to urge the strapping roll 200 to approach the rollers 241 of the loading unit 20. Further, referring to FIG. 5, the strapping roll 200 is placed on the rollers 241 in a rolling manner. There is no need for the strap dispenser 100 to incline downward. The strapping roll 200 can be easily placed in position from one side of the loading unit 20, so the operation is more labor-saving and simple.

Figure 6:
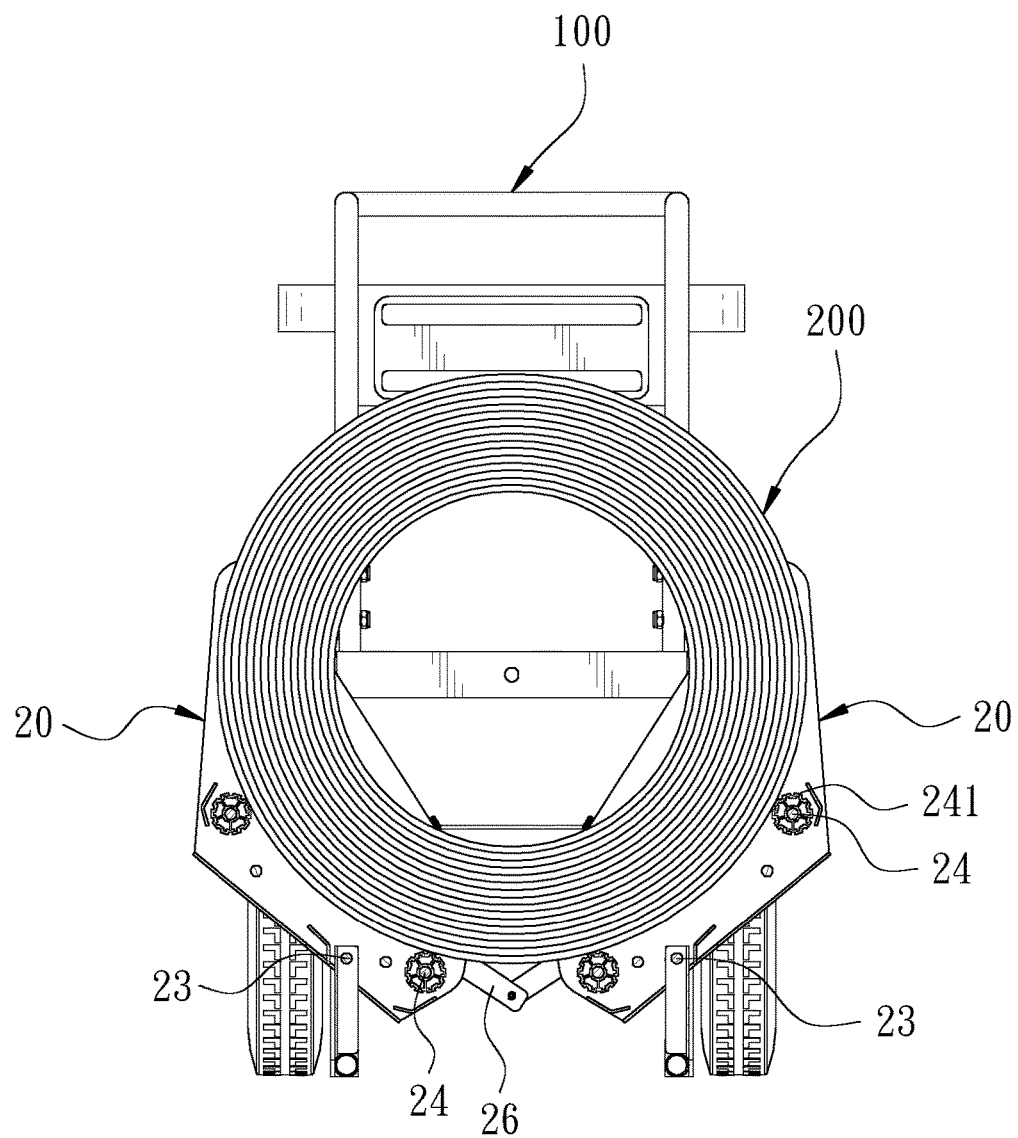
FIG. 6 is a schematic view in accordance with the preferred embodiment of the present invention when in use, showing the strapping roll positioned on the loading units.

As shown in FIG. 6, after the strapping roll 200 is placed on one of the loading units 20, the strapping roll 200 will be guided to be located between the two loading units 20 through the connecting member 26 and the restoring force of the elastic member 27. When the strapping roll 200 is pulled by the user, the strap dispenser 100 of the present invention can prevent the strapping roll 200 from being jammed or pulled out of the loading units 20 due to the action of the centrifugal force or the shaking caused by pulling the strapping roll 200. When the strapping roll 200 is placed in position between the two loading units 20, the main shaft 23 is located between the rotating shafts 24 of each loading unit 20. The wheel axle 31 is located on the same plane as the main shaft 23 of each loading unit 20 to ensure that the main shaft 23 is located between the rotating shafts 24 of each loading unit 20, such that the strapping roll 200 won't be jammed or pulled out of the loading units 20 due to the shaking caused by pulling the strapping roll 200.

Figure 7:
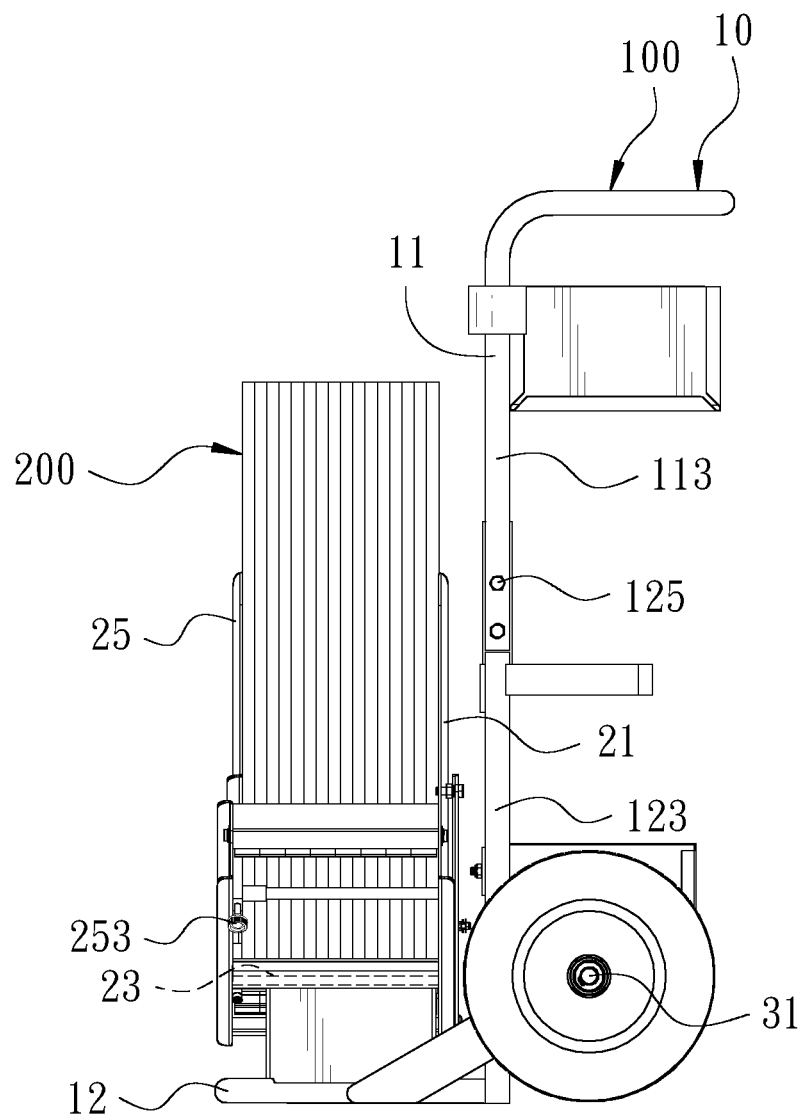
FIG. 7 is a side view in accordance with the preferred embodiment of the present invention when in use.

Please refer to FIG. 7 and FIG. 6. The second frame 12 is flat placed on the ground. The wheel axle 31 is located on the same plane as the main shafts 23 of the loading units 20, so that the center of gravity of the strap dispenser 100 is low and more stable. Through the positioning bolts 125 provided on the first coupling rods 113 and the second coupling rods 123 of the main body 10, the height of the first frame 11 is adjustable for different users. The adjustment plate 25 is adapted to adjust the distance between the first plate 21 and the adjustment plate 25 depending on the width of the strapping roll 200, and the adjustment plate 25 is secured by the adjustment bolts 253.

Figure 8:
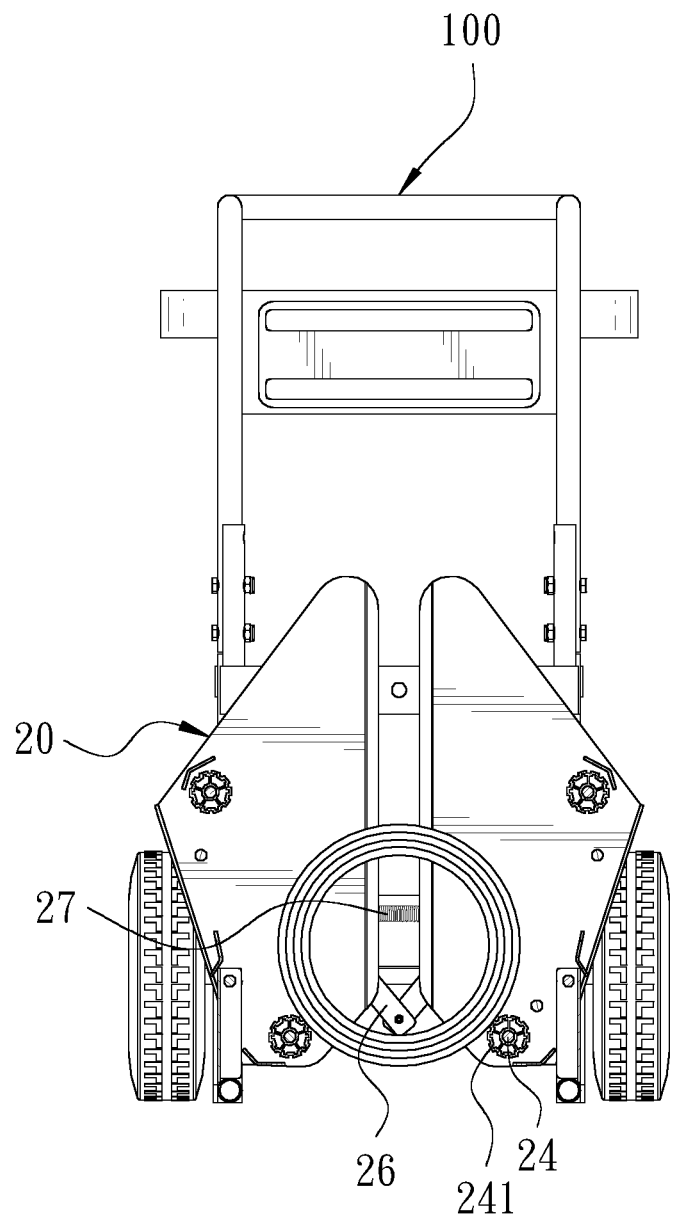
FIG. 8 is a schematic view in accordance with the preferred embodiment of the present invention when in use, showing the strapping roll reduced in diameter positioned on the loading units.

If the strapping roll 200 is reduced in diameter after use, as shown in FIG. 8, the loading units 20 approach each other through the connecting member 26 and the restoring force of the elastic member 27. The strapping roll 200 is clamped between the rollers 241 of the loading units 20 so that the strap dispenser 100 is not affected by the diameter of the strapping roll 200 when in use.

It is to be noted that the strapping roll 200 may be an iron strap roll, a PP strap roll, a PET strap roll, or the like. The outer diameter of the strapping roll 200 is about 200-650 centimeters, and the width is about 1.3-20 centimeters. The strap dispenser 100 of the present invention can be used widely.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A strap dispenser, comprising:
   a main body;
   two loading units, mounted to the main body, the loading units each including a first plate and a second plate, a main shaft being provided between the first plate and the second plate, the main shaft being pivotally connected to the main body, the loading units being further provided with a connecting member, the connecting member being connected to the first plates of the two loading units, the connecting member being connected with an elastic member;
   a mobile unit, mounted to the main body, the mobile unit including two wheels.

2. The strap dispenser as claimed in claim 1, wherein at least two rotating shafts are provided between the first plate and the second plate, a roller is fitted on each of the rotating shafts, and the main shaft is located between the rotating shafts.

3. The strap dispenser as claimed in claim 1, wherein the loading units each include an adjustment plate, the adjustment plate is disposed between the first plate and the second plate, the adjustment plate is provided with two receiving portions, the receiving portions are configured to receive adjustment levers respectively, the adjustment levers are located between the first plate and the second plate, and each of the receiving portions is provided with an adjustment bolt so that the adjustment plate is adjustable between the first plate and the second plate and secured by the adjustment bolt.

4. The strap dispenser as claimed in claim 1, wherein the connecting member includes two links, the two links are connected to the first plates of the two loading units respectively, the two links are pivotally connected to each other, and the elastic member is connected between the two links to provide a restoring force between the links.

5. The strap dispenser as claimed in claim 1, wherein the elastic member is a tension spring.

6. The strap dispenser as claimed in claim 1, wherein the mobile unit further includes a wheel axle, the wheels are located at two ends of the wheel axle respectively, and the wheel axle is located on a same plane as the main shaft.

7. The strap dispenser as claimed in claim 2, wherein one side of the roller is provided with a baffle plate.

8. The strap dispenser as claimed in claim 1, wherein the main body comprises a first frame and a second frame, the first frame has a first transverse rod, two ends of the first transverse rod are connected with first connecting rods respectively, the first connecting rods are connected with first coupling rods respectively, the second frame has a second transverse rod, two ends of the second transverse rod are connected with second connecting rods respectively, the second connecting rods are connected with second coupling rods respectively, and the second coupling rods are coupled to the first coupling rods, respectively.

9. The strap dispenser as claimed in claim 8, wherein each of the second connecting rods is longitudinally provided with a retaining plate, the retaining plate is formed with two perforations, and a transverse plate is provided between the second coupling rods.

10. The strap dispenser as claimed in claim 8, wherein the first coupling rods are provided with a plurality of first positioning holes respectively, the second coupling rods are provided with a plurality of second positioning holes corresponding to the first positioning holes of the first coupling rods respectively, and the first positioning holes and the second positioning holes are secured by a plurality of positioning bolts for adjusting the height of the first frame and the second frame.

* * * * *